United States Patent [19]
Catlin

[11] 3,896,689
[45] July 29, 1975

[54] TAPER TURNING ATTACHMENT
[75] Inventor: Francis D. Catlin, Horseheads, N.Y.
[73] Assignee: Hardinge Brothers, Inc., Elmira, N.Y.
[22] Filed: Aug. 17, 1973
[21] Appl. No.: 389,425

[52] U.S. Cl. .................... 82/17; 82/1.4; 82/14 A
[51] Int. Cl. .............................................. B23b 5/38
[58] Field of Search .................... 82/17, 14 A, 1.4

[56] References Cited
UNITED STATES PATENTS

| | | | |
|---|---|---|---|
| 2,612,680 | 10/1952 | Dow | 82/17 X |
| 2,736,222 | 2/1956 | Campbell | 82/17 X |
| 3,046,822 | 7/1962 | Von Zelewsky | 82/14 A |
| 3,120,141 | 2/1964 | Keichel | 82/17 |

Primary Examiner—Leonidas Vlachos
Attorney, Agent, or Firm—Shlesinger, Arkwright, Garvey & Dinsmore

[57] ABSTRACT

The invention relates to a taper turning attachment for a lathe or the like and includes a template which may be selectively moved to either a first position where it will engage a portion of the cross-slide or to a second position wherein the movement of the cross-slide is unaffected. The template is either raised or lowered by means of a piston and cylinder arrangement laterally mounted on the bed of the lathe and may be automatically actuated through the action of an appropriate programming mechanism. The cross-slide includes a downwardly extending lug which is provided with a roller for the purpose of engaging the guide face of the template during the lateral movement of the cross-slide with respect to the carriage thereby causing the tool to move in a path paralleling the template guide face. The angle of the guide face with respect to the spindle is angularly adjustable in the plane in which the cross-slide and carriage move.

19 Claims, 7 Drawing Figures

PATENTED JUL 29 1975

3,896,689

SHEET 2

TAPER TURNING ATTACHMENT

BACKGROUND OF THE INVENTION

The invention is particularly adapted for use with a lathe or the like which includes a rotatable work supporting spindle, a carriage mounted for movement on a bed and a cross-slide mounted for movement on the carriage in a direction transverse to the direction of movement of the carriage. In particular, this invention may be mounted on the machine tool described in the following U.S. Pat. No.: Francis D. Catlin, 3,663,999, May 23, 1972, Automatic Machine Tool Control Mechanism. The matter disclosed in this patent is hereby expressly incorporated by reference.

While template-type taper turning attachments for lathes or the like are old, the advent of automated multiple operation machine tools has required that the template be moved between its operative and inoperative positions rapidly and under the control of an automatic programming mechanism. Furthermore, in machining operations which require a high degree of precision, it is necessary that any movement of the template when it is engaged by the cross-slide carried contact member be kept to a minimum.

OBJECTS OF THE INVENTION

It is, therefore, an object of this invention to provide a taper turning apparatus including means for moving a template between its operative and inoperative positions which permits rapid conversion between taper turning operations and normal turning operations without effecting the angular adjustment of the template.

A further object of this invention is to provide a taper turning apparatus which may be easily mounted on a lathe and few alterations of the existing machine.

Another object of this invention is to provide a taper turning apparatus wherein the template undergoes little or no movement when contacted by the cross-slide assembly during a taper turning operation.

A further object of this invention is to provide a taper turning apparatus including a mechanism for raising or lowering a template which may be maintained free from the introduction of metal particles or other foreign matter therein.

A still further object of this invention is to provide a taper turning apparatus which may be incorporated into an existing automated multiple operation machine tool and controlled by the existing programming mechanism with minimal modifications.

Yet another object of this invention is to provide a taper turning apparatus wherein both the position of the template on the lathe bed and the angle of the template guide face are adjustable.

A further object of this invention is to provide a taper turning apparatus wherein the template adjustment means includes means for precisely setting the angle of taper.

A still further object of this invention is to provide a taper turning apparatus wherein the template is raised and lowered by means of a piston and cylinder arrangement including means for preventing rotation of the piston and cylinder relative to each other without unduly restricting the relative longitudinal movement thereof.

SUMMARY OF THE INVENTION

The invention relates to a taper turning apparatus for a lathe or the like including a bed, spindle means for rotating a workpiece, a carriage mounted on the bed for reciprocal movement relative to the spindle and a cross-slide mounted on the carriage for movement relative thereto. A template for selectively controlling the direction of movement of the cross-slide relative to the spindle as well as a mechanism for moving the template between operative and inoperative positions are mounted on the lathe. The cross-slide is provided with a follower which extends therefrom and engages a cam surface on the template only when the template is in its operative position.

DETAILED DESCRIPTION OF THE INVENTION ILLUSTRATED IN THE DRAWINGS

Figure 1:
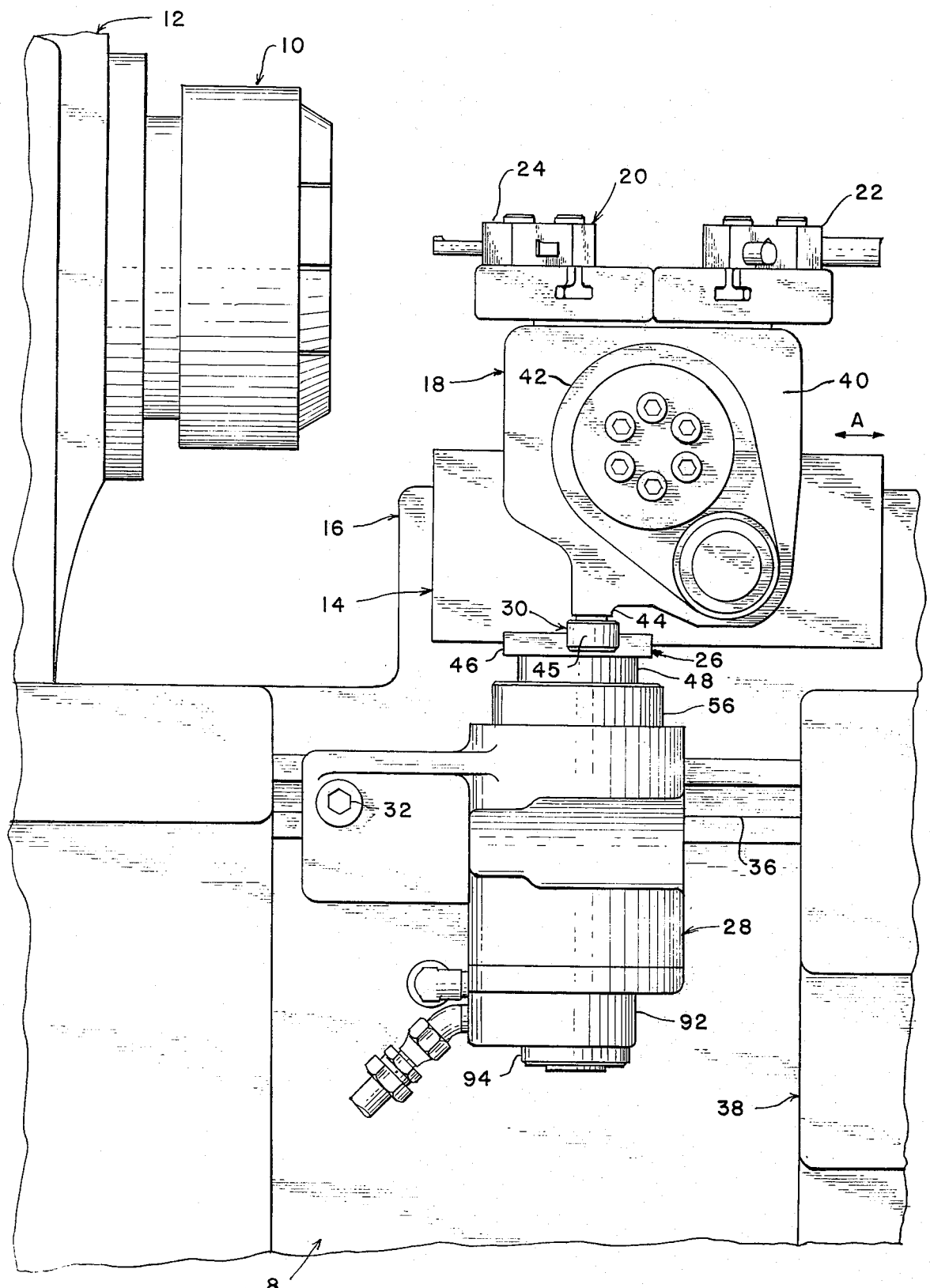
FIG. 1 is a front elevational view of the taper turning apparatus comprising this invention mounted on a lathe.

The invention may be mounted on a conventional lathe including a stationary support structure 8, a spindle 10 rotatably received in the headstock 12 of the support 8, a carriage 14 mounted on bed 16 for rectilinear movement in the direction of arrows A and a cross-slide 18 mounted on the carriage 14 for rectilinear movement in a direction transverse to that of the carriage. The turret 20 is rotatably mounted on cross-slide 18 and includes a plurality of tool holders such as 22 and 24. The carriage 14 and cross-slide 18 may be moved along their respective rectilinear paths by hydraulic and pneumatic operators or any other appropriate means well known in the art. Since the lathe itself is of the type disclosed in Catlin, U.S. Pat. No. 3,663,999, which patent is incorporated by reference, the lathe itself will not be described in detail.

The taper turning attachment includes generally a template 26, a template operator 28 and a follower 30, the latter being secured to the cross-slide 18 and depending therefrom. The template operator 28 mounts on the bed 16 of the lathe by means of two T-shaped bolts 32 and 34 which fit into T-shaped slot 36. This permits the position of the template operator 28 to be adjusted along the bed 16 between the headstock 12 and the programming mechanism 38 to suit the particular job.

The cross-slide housing 40 which houses the stop drum 42 includes a boss 44 which supports the follower roller 45, the latter engaging the template 26 in a manner to be described.

Figure 2:
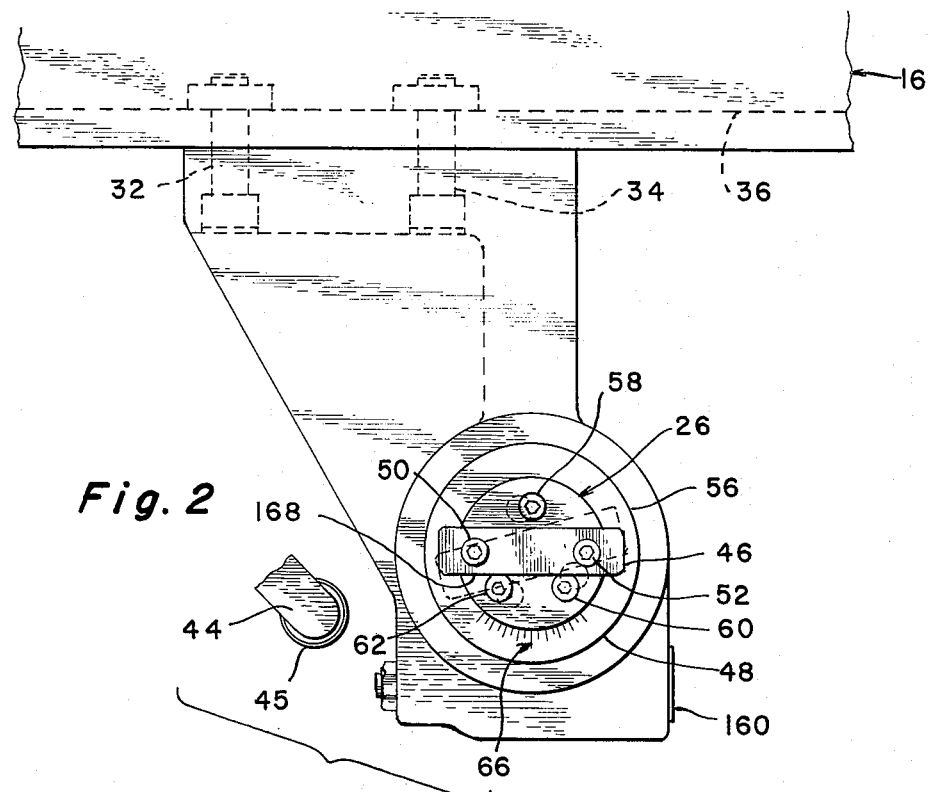
FIG. 2 is a fragmentary plan view of the present invention.
Figure 3:
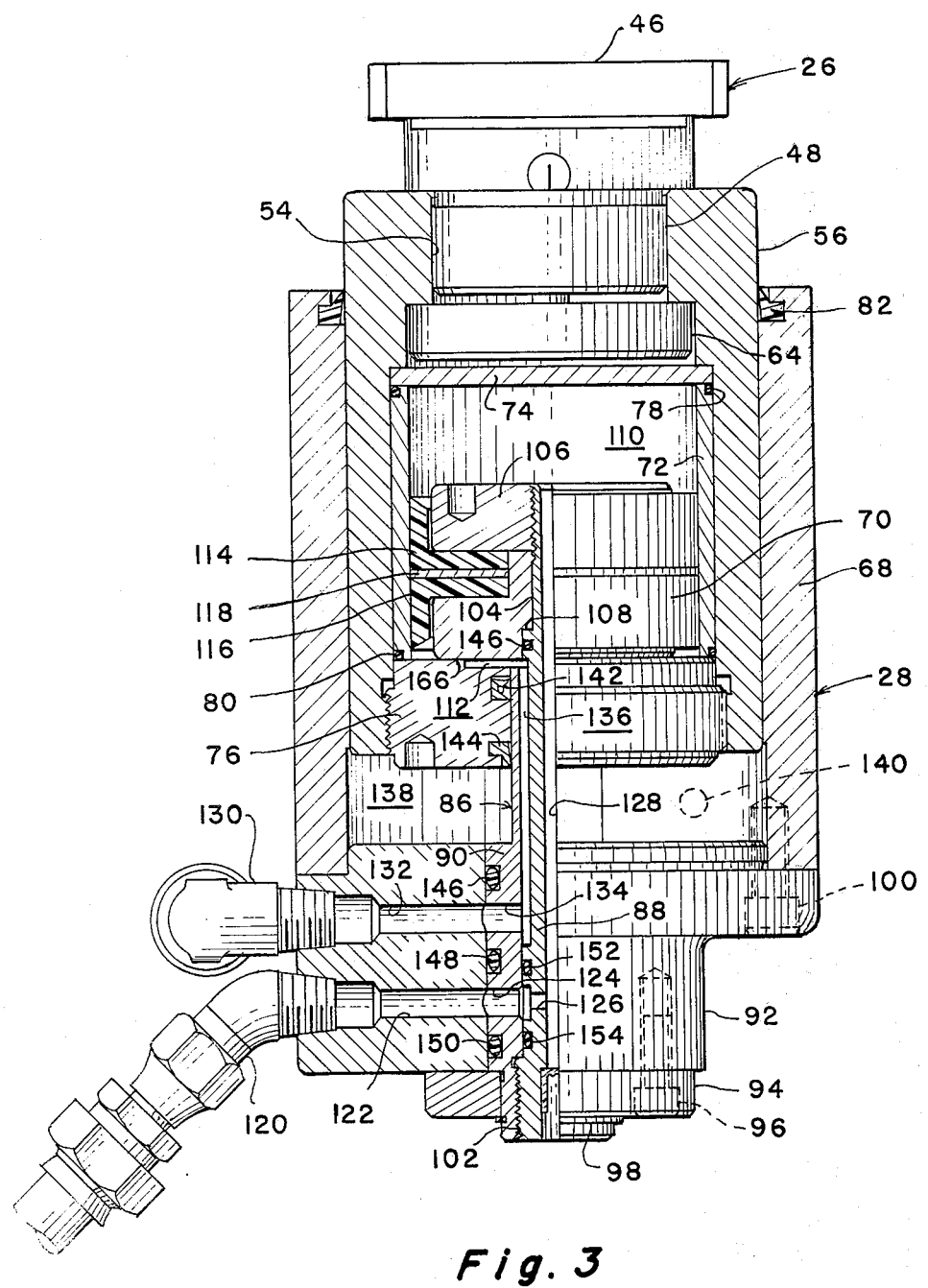
FIG. 3 is an enlarged front elevational view of the template and template operating means forming a part of this invention with a portion thereof shown in section to illustrate the details of construction.
Figure 4:
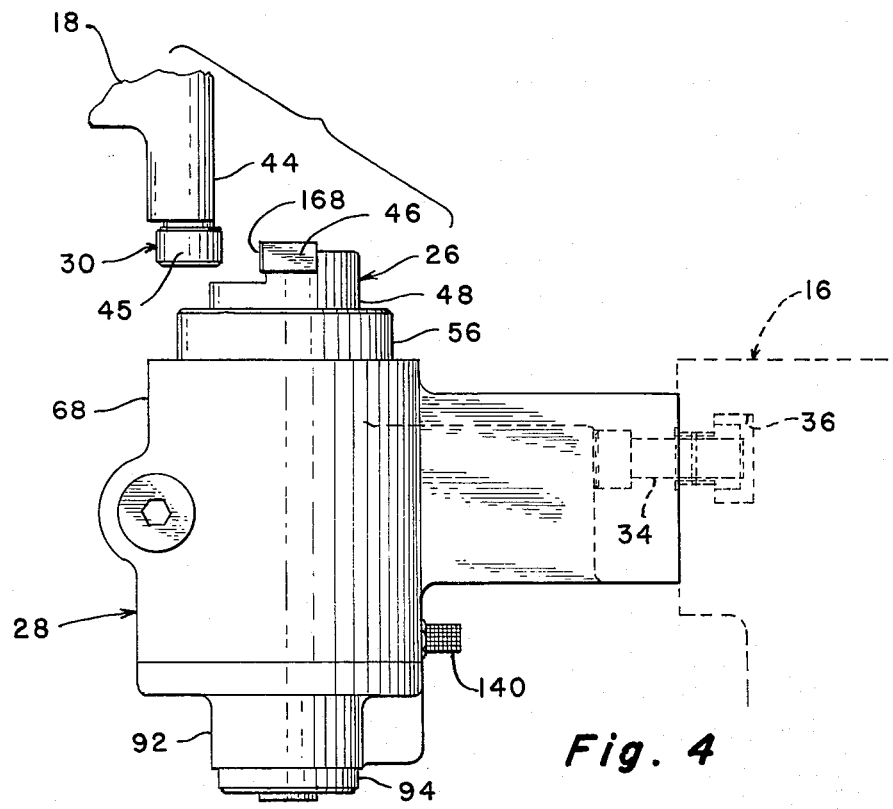
FIG. 4 is a side elevational view of the invention.
Figure 5:
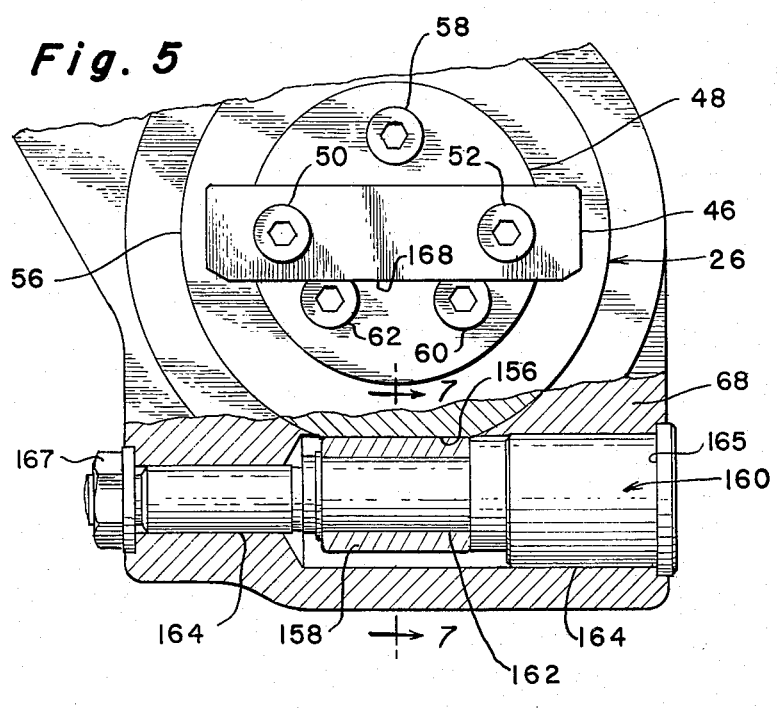
FIG. 5 is an enlarged fragmentary plan view of the template and template operating means with a portion thereof shown in section to illustrate the details of construction.

Referring now to FIGS. 2, 3 and 5, the template 26 comprises a guide bar 46 fastened to the guide bar holder 48 by means of bolts 50 and 52 and the guide bar holder 48 is mounted in the bore 54 of cylinder 56 by means of bolts 58, 60 and 62 and lock plate 64. By loosening the bolts 58, 60 and 62, the guide bar holder 48 may be rotated within the cylinder bore 54 and then clamped to the cylinder 56 when the desired angular orientation relative to the cross-slide has been achieved. To aid in the angular-setting of the guide bar 46, the cylinder 56 may be provided with a graduated scale 66.

Figure 6:
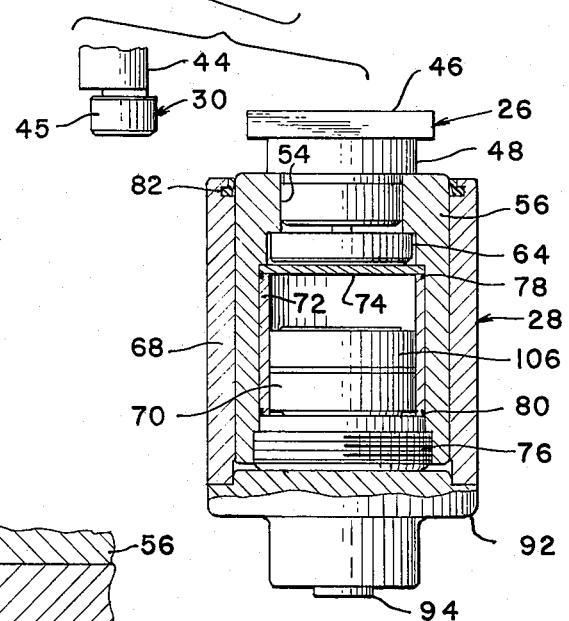
FIG. 6 is a fragmentary elevational view of the present invention with a portion thereof shown in section to illustrate the details of construction.

The template operator 28 will now be described with particular reference to FIGS. 3, 5 and 6.

The template guide bar 46 may be raised from its inoperative position through the action of the template operator 28. The cylinder 56 is slidably received in the operator housing 68 and slidably positioned around piston 70, the latter being rigidly mounted within housing 68. The cylinder 56 includes a liner 72, an upper plate 74 and a spanner nut 76 threadedly secured thereto. O-rings 78 and 80, which are positioned at the ends of liner 72, render the interior of cylinder 56 fluid-tight. Wiper ring 82 engages the outer surface of cylinder 56 as it slides within housing 68 thereby preventing the introduction of metal particles or other foreign matter within the operator assembly.

As shown in FIG. 3, the piston rod 86 is a two-piece assembly consisting of an inner member 88 and a concentric outer member 90. The piston rod 86 is rigidly secured to support cap 92 by means of retainer 94, bolts 96 and retaining ring 98, the latter being positioned in an annular slot in outer member 90. The support cap 92, in turn, is fastened to housing 68 by means of bolts 100. The inner member 88 is secured to outer member 90 by cooperating threads 102, and the upper portion 104 of the piston rod 86 fits within piston 70 and is secured thereto by means of spanner nut 106 drawing the piston 70 down onto annular shoulder 108. By these means, then, the assembly including spanner nut 106, piston 70, inner member 88 and outer member 90 is rigidly held together and stationarily mounted within housing 68.

In order to seal the expansible chambers 110 and 112, the piston 70 and spanner nut 106 assembly is provided with a pair of seals 114 and 116 as well as a spacer 118, which are compressed between spanner nut 106 and the piston 70.

An operating fluid is introduced into or evacuated from chamber 110 through hose 120, passageway 122 in support cap 92, passageway 124 in outer member 90 and passageways 126 and 128 in inner member 88. Fluid is introduced into or evacuated from chamber 112 through hose 130, passageway 132 in support cap 92, passageway 134 in outer member 90 and the annular passageway 136 formed between inner member 88 and outer member 90. Air is vented from the chamber 138 formed between cylinder 56 and support cap 92 by means of an exhaust 140. Seal 142 and wiper ring 144 prevent the leakage of fluid from chamber 112 to chamber 138 as the cylinder spanner nut 76 slides thereon. Additional sealing is provided by O-rings 146, 148, 150, 152 and 154.

Figure 7:
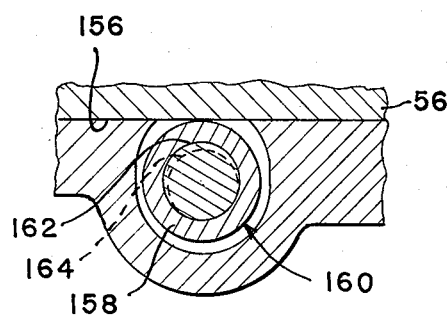
FIG. 7 is a sectional view taken along line 7—7 of FIG. 5 and viewed in the direction of the arrows.

Since the cylinder 56 which carries template 26 must be prevented from rotating when contacted by the follower 30, one side 156 of cylinder 56 is flattened and contacted by a hardened steel roller 158 which is rotatably mounted in housing 86 on stud 160. As best illustrated in FIG. 7, the portion 162 of stud 160 which supports roller 158 is eccentric to the other portions 164. This allows rotational adjustment of stud 160 to force the roller tightly against the cylinder flat 156 thereby preventing rotational movement of the cylinder while allowing freedom of axial movement. This adjustment of the stud 160 is maintained by drawing the stud against shoulder 165 by means of nut 167.

OPERATION

When it is desired to perform a taper turning operation, fluid under pressure is introduced through hose 120, passageways 122, 124, 126 and 128 into expansible chamber 110. This forces cylinder 56 to move in an upward direction until it contacts the lower face 166 of piston 70 and raises the guide bar 46 into the plane of follower 30. The cross-slide 18 and carriage 14 are then simultaneously fed at selective feed rates so that the follower 30 mounted on the cross-slide 18 will engage the guide face 168 of guide bar 46 throughout the entire travel required. Since the tool is rigidly connected to the turret 20 and cross-slide 18, it will machine the workpiece to an angle identical to the angle of rotation of the guide bar 46. The roller 158 will remain tightly against flattened portion 156 of piston 56, thereby preventing rotation about the cylinder axis.

If it is subsequently desired to perform a non-taper turning operation, fluid under pressure is introduced through hose 130, passageways 132, 134 and 136 into expansible chamber 112. This forces cylinder 56 to move in a downward direction until spanner nut 76 engages support cap 92. At this time, the guide bar 46 is positioned below the plane of movement of follower 30 and will have no effect on the motion of the cross-slide relative to the spindle 10.

The introduction and evacuation of fluid to or from chambers 110 and 112 may be controlled by a four-way solenoid operated valve which may be connected to one of the switches on the programmer described in the aforementioned U.S. Pat. No. 3,663,999. Referring to FIG. 2 of that patent, the cam 36 on the programmer 20 which mates with the particular switch 40 connected to the taper turning apparatus of the present invention may be used to elevate the template 26 to its operative position at a particular turrent position of the machining cycle. In this manner, the taper turning function may be fully incorporated into an automated multiple operation machine tool of the type described in Catlin, U.S. Pat. No. 3,663,999.

While this invention has been described as having a preferred design, it will be understood that it is capable of further modification. This application is, therefore, intended to cover any variations, uses, or adaptations of the invention following the general principles of the invention and including such departures from the present disclosure as come within known or customary practice in the art to which this invention pertains, and as may be applied to the essential features hereinbefore set forth and fall within the scope of this invention or the limits of the appended claims.

What is claimed is:

1. A taper turning apparatus for a lathe or the like including stationary support means and spindle means for rotating a workpiece, said turning apparatus comprising:

a. a carriage mounted on the lathe support means for reciprocal movement relative to the spindle,
b. a cross-slide mounted on the carriage for reciprocal movement relative thereto,
c. means for moving said carriage and said cross-slide along a selected one of a plurality of paths in relation to the spindle,
d. template supporting means mounted on the stationary support means,
e. a template being mounted on said template supporting means and including a guide face, and
f. follower means extending from said cross-slide and being constrained to move generally in an operating plane in unison with said cross-slide,
g. said template supporting means including means for moving said template guide face transversely to said operating plane between a first position within said operating plane and a second position outside said operating plane,
h. said template guide face being movable from said first position to said second position independently of the position of said follower in said operating plane,
i. whereby when said guide face is in said first position, said follower means will engage said guide face as said cross-slide moves along certain ones of said plurality of paths.

2. The taper turning apparatus of claim 1 and wherein said guide face is angularly adjustable about an axis perpendicular to said operating plane.

3. The taper turning apparatus of claim 1 and wherein said means for moving said template guide face includes a housing and a template holder slidably received in said housing for reciprocable movement.

4. The taper turning apparatus of claim 1 and wherein said template supporting means is adjustably mounted on said lathe.

5. The taper turning apparatus of claim 1 and wherein said template means includes mechanical means for positively holding said follower guide means against horizontal movement when contacted by said follower means.

6. The taper turning attachment of claim 5 and wherein said mechanical means includes an ecentrically mounted roller in engagement with said template means.

7. A taper turning apparatus for a lathe or the like including stationary support means and spindle means for rotating a workpiece, said turning apparatus comprising:
a. a carriage mounted on the stationary support means for substantially horizontal reciprocal movement relative to the spindle,
b. a cross-slide mounted on said carriage for substantially horizontal movement relative thereto,
c. follower means being rigidly secured to and extending from said cross-slide,
d. means for causing said cross-slide and said carriage to move relative to said spindle,
e. template means mounted on the stationary support means for controlling the direction of movement of said cross-slide relative to said spindle,
f. means for moving said template means in a substantially vertical direction between an operative position and an inoperative position,
g. said template means including follower guide means for contacting said follower means to thereby constrain the movement of said cross-slide only when said template means is in said operative position, and
h. said template means being movable from said operative position to said inoperative position independently of the position of said follower means.

8. The taper turning apparatus of claim 7 and wherein said template means includes mechanical means for positively holding said follower guide means against horizontal movement when contacted by said follower means.

9. A taper turning apparatus for a lathe or the like including stationary support means and spindle means for rotating a workpiece, said turning apparatus comprising:
a. a carriage mounted on the stationary support means for reciprocal movement relative to the spindle,
b. a cross-slide mounted on the carriage for reciprocal movement relative thereto,
c. means for moving said carriage and cross-slide along a selected one of a plurality of paths in relation to the spindle,
d. template supporting means mounted on the stationary support means,
e. a template being mounted on said template supporting means and including a guide face, and
f. follower means extending from said cross-slide and being constrained to move generally in an operating plane in unison with said cross-slide,
g. said template supporting means including means for moving said template guide face transversely to said operating plane between a first position within said operating plane and a second position outside said operating plane,
h. whereby when said guide face is in said first position, said follower means will engage said guide face as said cross-slide moves along certain ones of said plurality of paths,
i. said template supporting means including a housing,
j. said means for moving said template guide face including a piston and cooperating cylinder, said cylinder being slideably received in said housing for reciprocal movement along a direction transverse to said first plane.

10. The taper turning apparatus of claim 9 and wherein:
a. said piston means is rigidly secured to said housing, and
b. said cylinder means is slidably positioned about said piston means.

11. The taper turning apparatus of claim 9 and wherein said piston means includes a double acting piston and passageway means in said piston for permitting fluid to be admitted to and evacuated from both sides of said piston.

12. A taper turning apparatus for a lathe or the like including stationary support means and spindle means for rotating a workpiece, said turning apparatus comprising:
a. a carriage mounted on the lathe support means for reciprocal movement relative to the spindle,
b. a cross-slide mounted on the carriage for reciprocal movement relative thereto, c. means for moving said carriage and cross-slide along a selected one of a plurality of paths in relation to the spindle,
d. template supporting means mounted on the stationary support means,
e. a template being mounted on said template supporting means and including a guide face, and
f. follower means extending from said corss-slide and being constrained to move generally in an operating plane in unison with said cross-slide,
g. said template supporting means including means for moving said template guide face transversely to said first plane between a first position within said operating plane and a second position outside said operating plane
h. whereby when said guide face is in said first position, said follower means will engage said guide face as said cross-slide moves along certain ones of said plurality of paths,
i. said template supporting means including a housing,
j. said means for moving said template guide face including a piston and cooperating cylinder, said cylinder being slideably received in said housing for reciprocal movement along a direction transverse to said first plane,
k. said housing having an internal surface and said cylinder means having an external surface and sliding cooperation with said internal surface,
l. said external surface including a flattened portion,
m. said template supporting means including bearing means in engagement with said flattened portion.

13. The taper turning apparatus of claim 12 and wherein said bearing means includes a roller in rolling engagement with said flattened portion.

14. The taper turning apparatus of claim 13 and wherein:
a. said bearing means includes shaft means supporting said roller, and
b. said roller is eccentrically mounted on said shaft means.

15. A taper turning attachment for a lathe or the like including stationary support means, spindle means for rotating a workpiece, a carriage mounted on the support means for reciprocal movement relative to the spindle, a cross-slide mounted on the carriage for reciprocal movement relative thereto and a follower extending from the cross-slide being movable in a substantially horizontal plane and in unison with the cross-slide, said attachment comprising:
a. a housing adapted to be mounted on the stationary support means,
b. a piston rigidly secured to said housing,
c. a cylinder slidably received in said housing and slidably positioned around said piston,
d. said housing having an internal surface and said cylinder having an external surface in sliding cooperation with said housing internal surface,
e. said cylinder external surface having a flattened portion,
f. template means mounted on said cylinder and including a guide face adapted to contact and guide the follower along a selected path,
g. said template means and cylinder being movable rectilinearly within said housing between a first position wherein said guide face is operative to contact the follower and a second position wherein said guide face is inoperative to contact the follower, and
h. bearing means associated with said housing and in engagement with said flattened portion for rigidly and positively holding said template means and said cylinder against movement in any direction normal to said guide face.

16. The attachment of claim 15 and wherein said bearing means includes a roller in rolling engagement with said flattened portion.

17. The attachment of claim 16 and wherein:
a. said bearing means includes shaft means supporting said roller, and
b. said roller is eccentrically mounted on said shaft means.

18. The attachment of claim 15 and wherein said template means is adjustably mounted on said cylinder.

19. The attachment of claim 15 and including means for adjustably mounting said attachment on a lathe.

* * * * *

Disclaimer 3,896,689.—*Francis D. Catlin*, Horseheads, N.Y. TAPER TURNING ATTACHMENT. Patent dated July 29, 1975. Disclaimer filed Oct. 5, 1976, by the assignee, *Harding Brothers, Inc.*

Hereby enters this disclaimer to claims 1, 4 and 5 of said patent.

[*Official Gazette December 7, 1976.*]